Jan. 11, 1966 D. VAN ZEELAND 3,229,217

"H" NETWORK D.C. AMPLIFIER HAVING A DEAD ZONE TRANSFER CHARACTERISTIC FOR ELIMINATING IDLING CURRENTS

Filed March 28, 1962

INVENTOR.
Don Van Zeeland
BY
Paul J. Etlington
ATTORNEY

United States Patent Office 3,229,217
Patented Jan. 11, 1966

3,229,217

"H" NETWORK D.C. AMPLIFIER HAVING A DEAD ZONE TRANSFER CHARACTERISTIC FOR ELIMINATING IDLING CURRENTS

Don Van Zeeland, Milwaukee, Wis., assignor to General Motors Corporation, Detroit, Mich., a corporation of Delaware Filed Mar. 28, 1962, Ser. No. 183,116
5 Claims. (Cl. 330—18)

This invention relates to D.C. amplifiers and more particularly to a D.C. amplifier utilizing an "H" network wherein "idling" current is eliminated in the primary and secondary sides of the network.

D.C. voltage amplification and control may be accomplished, in suitable instances, by means of an "H" network. The "H" network is so called in that the network includes primary and secondary sides similar to the uprights of an "H" and a load connected intermediate the two sides to form the cross bar of the "H." In general, the primary and secondary sides each comprise series-connected legs in the form of current controlling elements such as transistors. The load is thus connected across the junctions of the legs of each side. To obtain controlled voltage variations across the load, each of the sides is connected across a D.C. voltage source and the conductivities of the four legs are varied in a complementary fashion; that is, only one of the legs on each side is fully conductive at one time. If, due to slow switching response of the leg elements, both legs of either or both sides are fully conductive so as to present a short circuit to the D.C. source, an inefficient and possibly damaging current flow can result. This short circuit current flow through the sides of an "H" network is known as an "idling" current and is obviously undesirable.

In accordance with this invention, a D.C. amplifier including an "H" network is provided whereby a load is connected between the junctions of adjacent legs of the primary and secondary sides of the network. Circuit control means are provided for controlling the conductivity of the legs whereby one leg of each of the primary and secondary sides is rendered conductive and the other leg is rendered non-conductive so that current will flow from a voltage source connected across each of the primary and secondary sides through the load via the conductive leg. Since the other leg of each of the primary and secondary sides is rendered non-conductive, no "idling" current will flow in either the primary or secondary side of the network. In addition, a "dead zone" characteristic is incorporated into the control means so as to provide a period between conductive and non-conductive periods of the legs wherein adjacent legs are rendered non-conductive.

A more complete understanding of this invention may be had from the detailed description which follows taken with the accompanying drawing in which.

Figures 1, 2:
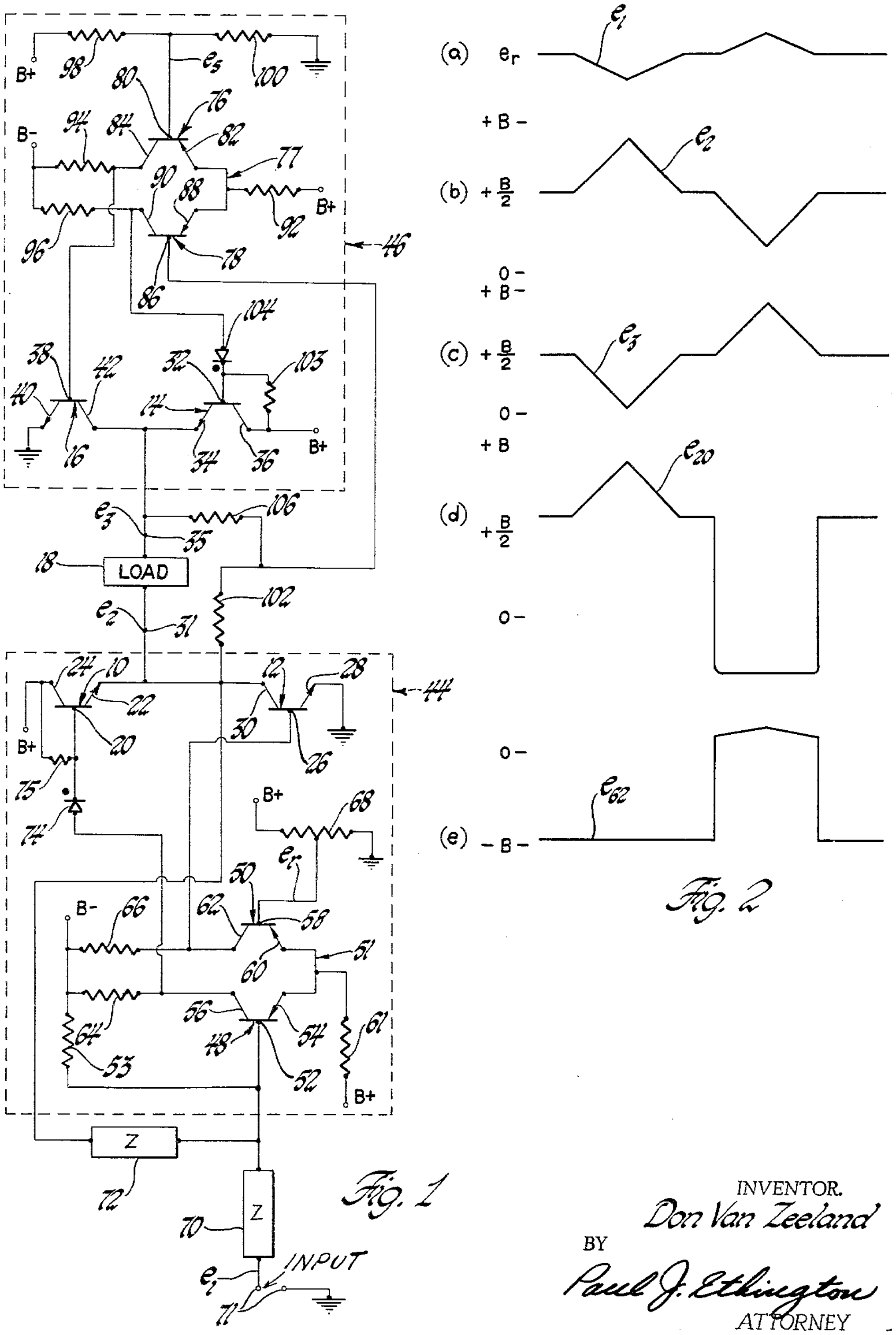
FIGURE 1 is a schematic circuit diagram of one embodiment of the invention.
FIGURE 2 is a graphical representation of voltage wave forms with respect to ground at various points in the schematic circuit diagram shown in FIGURE 1.

Referring now to FIGURE 1 there are shown NPN type transistors 10, 12, 14 and 16 connected together to form an "H" network with a load 18. The transistors 10 and 12 may be considered as the primary side of the network and the transistors 14 and 16 may be considered as the secondary side of the network. The transistor 10 comprises a base 20, an emitter 22 and a collector 24 and the transistor 12 comprises a base 26, an emitter 28 and a collector 30. The transistor 14 comprises a base 32, an emitter 34 and a collector 36 and the transistor 16 comprises a base 38, an emitter 40 and a collector 42.

The emitters 28 and 40 of the transistors 12 and 16, respectively, are connected with ground and the collectors 24 and 36 of the transistors 10 and 14, respectively, are connected with a B+ voltage supply source. Resistors 75 and 103 are respectively connected between the base 20 and collector 24 of transistor 10 and the base 32 and collector 36 of transistor 14 to provide a degree of forward bias potential from the B+ voltage source for the transistors 10 and 14. The emitter 22 of the transistor 10 is connected with the collector 30 of the transistor 12 and with a terminal 31 connected with the load 18 and the emitter 34 of the transistor 14 is connected with the collector 42 of the transistor 16 and with a terminal 35 connected with the load 18.

The primary side of the "H" network is enclosed within a high gain operational amplifier 44 including PNP type transistors 48 and 50 connected together so as to form a differential amplifier 51. The transistor 48 includes a base 52, an emitter 54, and a collector 56 and the transistor 50 comprises a base 58, an emitter 60 and a collector 62. The emitter 60 of the transistor 50 is connected in common with the emitter 54 of the transistor 48 and with a B+ voltage supply source via a current limiting resistor 61. The collector 56 of the transistor 48 is connected with a B− voltage supply source via a current limiting resistor 64, and the collector 62 of the transistor 50 is connected with the B− voltage supply source via a current limiting resistor 66. The base 58 of the transistor 50 is connected with a B+ voltage supply source via a potentiometer 68 so as to obtain a reference signal voltage $e_r$ on the base 58. The base 52 of the transistor 48 is connected with the B− voltage supply source via a current limiting resistor 53 and to one terminal of a pair of input terminals 71 via an impedance 70 so as to receive an input signal voltage $e_1$. The other input terminal 71 is connected with ground. Output voltages existing on the collector 56 of the transistor 48 are applied to the base 20 of the transistor 10 via a Zener diode 74. Output voltages existing on the collector 62 of the transistor 50 are applied to the base 26 of the transistor 12. An output voltage $e_2$ will be obtained from the primary side of the "H" network and will appear on terminal 31. The output voltage $e_2$ is applied through a degenerative feedback path including an impedance 72 to the base 52 of the transistor 48 for purposes of controlling the gain of the operational amplifier 44.

The secondary side of the "H" network is enclosed within a high gain operational amplifier 46 including PNP type transistors 76 and 78 connected together so as to form a differential amplifier 77. The transistor 76 includes a base 80, an emitter 82 and a collector 84 and the transistor 78 includes a base 86, an emitter 88 and a collector 90. The emitters 82 and 88 of the transistors 76 and 78, respectively, are connected together in common with a B+ voltage supply source via a current limiting resistor 92. The collector 84 of the transistor 76 is connected with a B− voltage supply source via a current limiting resistor 94 and the collector 90 of the transistor 78 is connected with the B− voltage supply source via a current limiting resistor 96. The base 80 of the transistor 76 is connected with a voltage divider circuit including a resistor 98 and a resistor 100 connected together in series between the B+ voltage supply source and ground so as to obtain a voltage reference signal $e_s$ on the base 80. The base 86 of the transistor 78 is connected with the output terminal 31 on the primary side of the "H" network via a current limiting resistor 102 so as to provide an input voltage signal to the base 86 equal in magnitude to the output voltage $e_2$ of the primary side of the "H" network. The output voltages existing on the collector 90 of the transistor 78 are applied to the base 32 of the transistor 14 via a Zener diode 104. The output voltages existing on the collector 84 of the transistor 76 are applied to the base 38 of the transistor 16. An output voltage $e_3$ will be obtained from the secondary side of the "H" network and will appear on the terminal 35. The output voltage $e_3$ is applied through a degenerative feedback path including the resistor 106 to the base 86 of the transistor 78 for purposes of controlling the gain of the operational amplifier 46.

The resistance of the resistor 98 is equal to that of resistor 100 so as to insure that the voltage reference signal $e_s$ will be equal to one half the potential of the B+ voltage supply source. The resistors 102 and 106 are of equal resistance and hence the gain of the operational amplifier 46 will be equal to $-1$. Each of the Zener diodes 74 and 104 has a breakdown voltage which is a function of the potential of the B+ voltage supply source.

When the input signal voltage $e_1$ is equal to the input reference voltage $e_r$, the potential existing on the collector 56 of the transistor 48 will be large enough to cause the output voltage $e_2$ of the primary side of the "H" network to be at a potential equal to one half that of the B+ voltage supply source as is shown in FIGURES 2*a* and 2*b*. The output voltage $e_2$ of the primary side of the "H" network is applied to the input of the operational amplifier 46 via the resistor 102 and hence, since the gain of operational amplifier 46 is equal to $-1$, and because the signal reference voltage $e_s$ is also equal to one-half the potential of the B+ voltage supply source, the potential $e_3$ existing on terminal 35 will be equal to one-half that of the B+ voltage supply source as is shown in FIGURE 2*c*. Thus the voltage existing across the load 18 will be equal to $e_2-e_3$ or zero voltage.

If the input signal voltage $e_1$ is less positive than the reference voltage $e_r$, the transistor 48 will be conductive and the transistor 50 will be cut off. The potential existing on the collector 56 of the transistor 48 will be sufficient to raise the potential $e_{20}$ as shown in FIGURE 2*d* on the base 20 of the transistor 10. When the potential $e_{20}$ becomes sufficiently positive to apply forward biasing potential to the transistor 10, the transistor 10 will conduct and the output voltage $e_2$ of the primary side of the "H" network will be more positive and of greater value than one half the potential of the B+ voltage supply source as is seen from FIGURES 2*b* and 2*d*. Since the output voltage $e_2$ is applied to the base 86 of the transistor 78 via the resistor 102 the potential existing on the base 86 will be more positive than the reference voltage $e_s$ existing on the base 80 of the transistor 76, rendering the transistor 76 conductive and the transistor 78 cut off. The potential existing on the collector 84 of transistor 76 will be sufficiently positive to apply forward biasing voltage to the base 38 of the transistor 16 whereby the transistor 16 will be rendered conductive. Since the gain of the operational amplifier 46 is equal to $-1$, $\Delta e_3$ will be equal to $-\Delta e_2$, where $\Delta e_3$ and $\Delta e_2$ are the changes in $e_3$ and $e_2$, respectively. The potential existing across the load 18 will be equal to $e_2-e_3$ or $2\Delta e_2$ and thus current will flow from the B+ voltage supply source from the collector 24 to emitter 22 of the transistor 10 through the load 18 from the terminal 31 to the terminal 35 and from the collector 42 to emitter 40 of the transistor 16 to ground.

However, if the input signal voltage $e_1$ is more positive than the reference voltage $e_r$ the transistor 50 will be conductive and the transistor 48 will be cut-off. When the potential $e_{62}$ as shown in FIGURE 2*e* existing on the collector 62 of the transistor 50 becomes sufficiently positive to apply forward biasing potential to the base 26 of the transistor 12, the transistor 12 will become conductive and hence the output voltage $e_2$ of the primary side of the "H" network will be less positive than one half the potential of the B+ voltage supply source as shown in FIGURE 2*b*. Since the output voltage $e_2$ is applied to the input of the operational amplifier 46 via the resistor 102 the potential existing on the base 86 of the transistor 78 will be rendered less positive than the reference voltage $e_s$ existing on the base 80 of the transistor 76 rendering the transistor 78 conductive and the transistor 76 cut-off. The potential existing on the collector 90 of the transistor 78 will be sufficient to raise the potential on the base 32 of the transistor 14. Since the gain of the operational amplifier 46 is equal to $-1$ as explained hereinbefore $\Delta e_3$ will be equal to $-\Delta e_2$. The voltage existing across the load 18 will thus be equal to $e_2-e_3$ or $2\Delta e_2$ and current will flow from the B+ voltage supply source from the collector 36 to emitter 34 of the transistor 14 through the load 18 from the terminal 35 to the terminal 31 and from the collector 30 to emitter 28 of the transistor 12 to ground.

It will be appreciated from an examination of FIGURE 1 that if at any time transistors 12 and 14 are simultaneously conductive with transistors 10 and 16, such that either or both of the sides of the "H" network are short circuited, a current surge, or "idling" current as previously described, will flow down the side of the "H" rather than through the load. This situation may occur during the period of voltage reversal across the load 18 and may be due to slow switching action in the transistors.

In accordance with this invention, artificial "dead zones" are incorporated in the operational amplifiers 44 and 46 so as to prevent transistors 12 and 14 from being even partially conductive when the transistors 10 and 16, respectively, are conductive and vice versa. This is more readily understood from the following explanation of the "dead zone" characteristic of the operational amplifier 44. When the input signal voltage $e_1$ is less positive than the reference voltage $e_r$ the transistor 48 will be conductive and the transistor 50 will be cut-off. The potential existing on the collector 62 of transistor 50 will be sufficiently negative to apply a negative potential to the base 26 of transistor 12 rendering the transistor 12 cut-off. The voltage existing on collector 56 of transistor 48 is applied to the base 20 of transistor 10 via the Zener diode 74 so that when the summation of the collector voltage and the Zener voltage is sufficiently positive the transistor 10 will be rendered conductive. However, when the input signal voltage $e_1$ is more positive than the reference voltage $e_r$, the transisitor 50 will conduct and the transistor 48 will be cut-off. The voltage existing on collector 62 of transistor 50 is applied to the base 26 of transistor 12 and when it is sufficiently positive the transistor 12 will be rendered conductive. During the switching period, i.e., switching of conductivity of transistors 10 and 12, a period exists wherein both transistors 10 and 12 are rendered nonconductive. This period may be termed a "dead zone."

The "dead zone" characteristic may be more readily understood from FIGURES 2*d* and 2*e* which show that when a point is reached where the collector voltages are of the same general potential two conditions must be met: first, that this point must be negative in nature to assure cut-off of transistor 12; and second, that the net sum of this poential and one-half Zener voltage must be less than zero to assure cut-off of transistor 10 when transistor 12 is just beginning to conduct. The degenerative feedback loop including the impedances 70 and 72 minimizes any adverse effects upon the gain characteristics of the operational amplifier 44 due to the "dead zone." The same analysis of the "dead zone" characteristic of the operational amplifier 44 applies to the operational amplifier 46 and hence no further explanation is required for a clear understanding of the invention.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A D.C. amplifier for providing reversible polarity direct voltage across a load comprising first and second operational amplifiers each having an input and an output, a degenerative feedback impedance connected with the output and input of each operational amplifier for controlling the gain thereof, a load having a pair of terminals, the output of the first operational amplifier connected with one of the terminals and the output of the second operational amplifier connected with the other terminal, the first operational amplifier including first and second transistors and the second operational amplifier including third and fourth transistors, each transistor including an emitter, a base and a collector, the emitter of the first transistor connected with the collector of the second transistor and with one terminal of the load, the emitter of the third transistor connected with the collector of the fourth transistor and with the other terminal of the load, the collector of the first transistor and the emitter of the second transistor connected across a source of direct voltage, the collector of the third transistor and the emitter of the fourth transistor connected across a source of direct voltage, a first conductive path including the first transistor, the load and the fourth transistor, a second conductive path including the third transistor, the load and the second transistor, the first and second operational amplifiers respectively including first and second differential amplifiers, each differential amplifier having first and second inputs and first and second outputs, each first input connected with electrical means for receiving an input reference voltage, the second input of the first and second differential amplifiers being respectively connected with the input of the first and second operational amplifiers for receiving input signal voltages whereby each first output will be energized when the input signal voltage to each second input is more negative than the input reference voltage to each first input and each second output will be energized when the input signal voltage to each second input is more positive than the input reference voltage to each first input, the first output of the first differential amplifier connected with the base of the first transistor via a Zener diode and the second output of the first differential amplifier connected with the base of the second transistor, the first output of the second differential amplifier connected with the base of the third transistor via a Zener diode and the second output of the second differential amplifier connected with the base of the fourth transistor, the operational amplifiers simultaneously having dead zone periods during which both paths are non-conductive thereby preventing current flow through both transistors of the first and second operational amplifiers, respectively, when the polarity of the voltage across the load is being reversed.

2. A D.C. amplifier for providing reversible polarity direct voltage across a load comprising first and second operational amplifiers each having an input and an output, a degenerative feedback impedance connected with the output and input of each operational amplifier for controlling the gain thereof, a load having a pair of terminals, the output of the first operational amplifier connected with one of the terminals and the output of the second operational amplifier connected with the other terminal, the input of the second operational amplifier connected with the output of the first operational amplifier, the first operational amplifier including first and second transistors and the second operational amplifier including third and fourth transistors, each transistor including an emitter, a base and a collector, the emitter of the first transistor connected with the collector of the second transistor and with one terminal of the load, the emitter of the third transistor connected with the collector of the fourth transistor and with the other terminal of the load, the collector of the first transistor and the emitter of the second transistor connected across a source of direct voltage, the collector of the third transistor and the emitter of the fourth transistor connected across a source of direct voltage, a first conductive path including the first transistor, the load and the fourth transistor, a second conductive path including the third transistor, the load and the second transistor, the first and second operational amplifiers respectively including first and second differential amplifiers, each differential amplifier having first and second inputs and first and second outputs, each first input connected with electrical means for receiving an input reference voltage, the second input of the first and second differential amplifiers being respectively connected with the input of the first and second operational amplifiers for receiving input signal voltages whereby each first output will be energized when the input signal voltage to each second input is more negative than the input reference voltage to each first input and each second output will be energized when the input signal voltage to each second input is more positive than the input reference voltage to each first input, the first output of the first differential amplifier connected with the base of the first transistor via a Zener diode and the second output of the first differential amplifier connected with the base of the second transistor, the first output of the second differential amplifier connected with the base of the third transistor via a Zener diode and the second output of the second differential amplifier connected with the base of the fourth transistor, the second operational amplifier having a gain of -1 whereby the value of the voltage existing across the load is equal to twice the voltage existing at the output of the first operational amplifier, the operational amplifiers simultaneously having dead zone periods during which both paths are non-conductive thereby preventing current flow through both transistors of the first and second operational amplifiers, respectively, when the polarity of the voltage across the load is being reversed.

3. A D.C. amplifier for providing reversible polarity direct voltage across a load in response to variations in the character of an input signal quantity and comprising a network having a primary side and a secondary side, the primary side including first and second current controlling elements connected together in series across a direct voltage source, the secondary side comprising third and fourth current controlling elements connected together in series across a direct voltage source; a load connected between the junction of the first and second current controlling elements and the junction of the third and fourth current controlling elements; first and second control means respectively connected to the current controlling elements of the primary and secondary sides for controlling the conductivity thereof, the first and second control means being connected to receive the input signal quantity and responsive to input signals of a first character to render one of the current controlling elements on each of the primary and secondary sides conductive and responsive to input signals of a second character to render the other current controlling elements conductive; means connected to the first and third current controlling elements to render said first and third current controlling elements non-conductive for input signals within a predetermined range intermediate the first and second characters thereby to obtain a dead zone characteristic during the load voltage reversal, and first and second negative feedback circuits connected between the load and the first and second control means, respectively, for controlling the gain of the amplifier.

4. A D.C. amplifier for providing reversible polarity direct voltage across a load in response to variations in the character of an input control signal and comprising a network having a primary side and a secondary side, the primary side including first and second transistors connected together in series across a direct voltage source, the secondary side comprising third and fourth transistors connected together in series across a direct voltage source; the transistors being of like conductivity type; a load connected between the junction of the first and second transistors and the junction of the third and fourth transistors;

the combination defining a first conduction path including the first transistor, the load and the fourth transistor, and a second conduction path including the third transistor, the load and the second transistor; first and second differential type control means each having an input and two complementary outputs, the inputs being connected to receive the input control signal, the outputs of the first control means being individually connected to the first and second transistors and the outputs of the second control means being individually connected to the third and fourth transistors thereby to complementally control the conductivities of the transistors, the control means being responsive to control signals of a first character to render the transistors of the first conduction path conductive and responsive to signals of a second character to render the transistors of the second conduction path conductive, first and second asymmetrically conductive means connected between the first and second control means and the first and third transistors to render the first and third transistors nonconductive for input signals of a character intermediate the first and second character thereby to obtain a dead zone characteristic during load voltage reversal, and first and second negative feedback means connected between the load and the inputs of the first and second control means, respectively.

5. A D.C. amplifier for providing reversible polarity direct voltage across a load in response to variations in the character of an input control signal and comprising a network having a primary side and a secondary side, the primary side including first and second transistors connected together in series across a direct voltage source; the secondary side comprising third and fourth transistors connected together in series across a direct voltage source; the transistors being of a like conductivity type; a load connected between the junction of the first and second transistors and the junction of the third and fourth transistors; the combination defining a first conduction path including the first transistor, the load and the fourth transistor, and a second conduction path including the second transistor, the load and the third transistor; control means including first and second differential amplifiers, each having two voltage comparison inputs and two complementary outputs; the output of the first amplifier being individually connected to the first and second transistors and the output of the second amplifier being individually connected to the third and fourth transistors thereby to complementally control the conductivities of the transistors; one input of each of the amplifiers being connected to a source of reference voltage, the other input of each of the amplifiers being connected to receive the input control signal; the amplifiers being responsive to control signals of a first magnitude to render the transistors of the first conduction path conductive and responsive to signals of a second magnitude to render the transistors of the second conduction path conductive, first and second asymmetrically conductive means connected between the first and second differential amplifiers and the first and third transistors, respectively, to render the first and third transistors non-conductive for input signals of a magnitude intermediate the first and second magnitudes thereby to obtain a dead zone characteristic during load voltage reversal, and first and second negative feedback circuits connected between the load and the other input of the first and second differential amplifiers, respectively.

References Cited by the Examiner

UNITED STATES PATENTS

| | | | |
|---|---|---|---|
| 2,936,345 | 5/1960 | Kinkel | 330—74 |
| 3,054,067 | 9/1962 | Merrill et al. | 330—15 |

ROY LAKE, *Primary Examiner.*

NATHAN KAUFMAN, *Examiner.*